United States Patent
Card et al.

(10) Patent No.: US 9,202,041 B2
(45) Date of Patent: Dec. 1, 2015

(54) PERMANENT LOCKOUT ATTACK DETECTION

(71) Applicant: Fairchild Semiconductor Corporation, San Jose, CA (US)

(72) Inventors: Robert A. Card, Scarborough, ME (US); Jefferson Hopkins, Orrington, ME (US); Christian Klein, Portland, ME (US); Myron J. Miske, Newfields, NH (US); Michael Smith, Weare, NH (US); John R. Turner, Portland, ME (US); Jaeyoung Yoo, Scarborough, ME (US)

(73) Assignee: Fairchild Semiconductor Corporation, San Jose, CA (US)

( * ) Notice: Subject to any disclaimer, the term of this patent is extended or adjusted under 35 U.S.C. 154(b) by 25 days.

(21) Appl. No.: 14/174,536

(22) Filed: Feb. 6, 2014

(65) Prior Publication Data

US 2014/0223557 A1   Aug. 7, 2014

Related U.S. Application Data

(60) Provisional application No. 61/762,262, filed on Feb. 7, 2013.

(51) Int. Cl.
*H04L 29/06* (2006.01)
*G06F 21/44* (2013.01)
*G06F 21/55* (2013.01)

(52) U.S. Cl.
CPC .............. *G06F 21/44* (2013.01); *G06F 21/554* (2013.01)

(58) Field of Classification Search
CPC ..................................................... G06F 21/44
See application file for complete search history.

(56) References Cited

U.S. PATENT DOCUMENTS

| | | | |
|---|---|---|---|
| 5,150,368 A * | 9/1992 | Autruong et al. | 714/747 |
| 7,350,081 B1 * | 3/2008 | Best | 713/190 |
| 7,483,936 B2 * | 1/2009 | Janssen et al. | 708/513 |
| 8,085,768 B1 * | 12/2011 | Hui et al. | 370/389 |
| 2002/0091850 A1 * | 7/2002 | Perholtz et al. | 709/231 |
| 2003/0182327 A1 * | 9/2003 | Ramanujam et al. | 707/204 |
| 2006/0020825 A1 * | 1/2006 | Grab | 713/193 |
| 2006/0098795 A1 * | 5/2006 | Choti et al. | 379/114.14 |
| 2008/0022041 A1 * | 1/2008 | Nakajima | 711/114 |
| 2009/0024991 A1 * | 1/2009 | Campbell et al. | 717/173 |
| 2010/0161151 A1 * | 6/2010 | Yang et al. | 700/297 |
| 2010/0275018 A1 * | 10/2010 | Pedersen | 713/168 |
| 2010/0299553 A1 * | 11/2010 | Cen | 714/4 |
| 2010/0325495 A1 * | 12/2010 | Talla et al. | 714/49 |

(Continued)

FOREIGN PATENT DOCUMENTS

CN    103984893 A    8/2014
KR    1020140100912 A    8/2014

OTHER PUBLICATIONS

"Chinese Application Serial No. 201420058318.0, Office Action mailed May 21, 2014", w/English Translation, 5 pgs.

(Continued)

*Primary Examiner* — Morshed Mehedi
(74) *Attorney, Agent, or Firm* — Schwegman Lundberg & Woessner, P.A.

(57) ABSTRACT

This document discusses, among other things, an attack detection module configured to permanently shut down a slave device after a number of consecutive attacks.

20 Claims, 2 Drawing Sheets

(56) References Cited

U.S. PATENT DOCUMENTS

2013/0139252 A1* 5/2013 Paranjape et al. ............... 726/22
2015/0039911 A1   2/2015 Card

OTHER PUBLICATIONS

"Chinese Application Serial No. 201420058318.0, Response filed Aug. 5, 2014 to Office Action mailed May 21, 2014", w/English Claims, 12 pgs.

* cited by examiner

PERMANENT LOCKOUT ATTACK DETECTION

CLAIM OF PRIORITY

This application claims the benefit of priority under 35 U.S.C. §119(e) of U.S. Provisional Application Ser. No. 61/762,262, titled, "PERMANENT LOCKOUT ATTACK DETECTION," filed on Feb. 7, 2013, which is incorporated by reference herein in its entirety.

BACKGROUND

In master/slave architecture, a master device or process can have control over one or more slave devices or processes. For example, a master device can include a mobile phone, a tablet, or one or more other personal electronic device, and a slave device can include an accessory for such master device, such as a headset, an external monitor, or one or more other accessories connected, for example, using a communication standard or protocol, such as a universal serial bus (USB) or other standard, etc.

OVERVIEW

This document discusses, among other things, an attack detection module configured to permanently shut down a slave device after a number of consecutive attacks.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventors have recognized, among other things, a lockout algorithm for master or slave attack detection. In an example, the lockout algorithm described herein can successfully count the number of consecutive attacks, independent of interleaved power-on resets (PORs), and can implement a permanent lockout based on a number (e.g., a programmable number, such as between 2-225 or greater) of consecutive attacks. A system can include non-volatile memory (NVM) configured to store the lockout status, which, in certain examples, once set, cannot be cleared.

In an example, authentication can be required across an identification (ID) component (e.g., ID pin) of a communication protocol (e.g., USB) between master and slave devices. One such authentication can include a slave device challenge to the master device. During such authentication, the master device can send a checksum (e.g., appended to the random number) to the accessory device. The slave device can compare the checksum to an internal checksum generation. If the internal checksum matches the received checksum, the master device is a valid device. If the internal checksum does not match the received checksum, the master device is not a valid device. In an example, the lockout algorithm can permanently shut down the slave device if the internal checksum does not match the received checksum (checksum mismatch) a number of consecutive times.

In an example, at least one of the master or slave devices can include a dedicated NVM register to store the count of consecutive checksum mismatches. In an example, the lockout algorithm can assume an attack on each attach in order to minimize an attacker circumventing the lockout. Thus, the NVM register can receive two writes for every slave-device attach without an attack. Each attach is presumed guilty of an attack until otherwise proven innocent.

Figure 1:
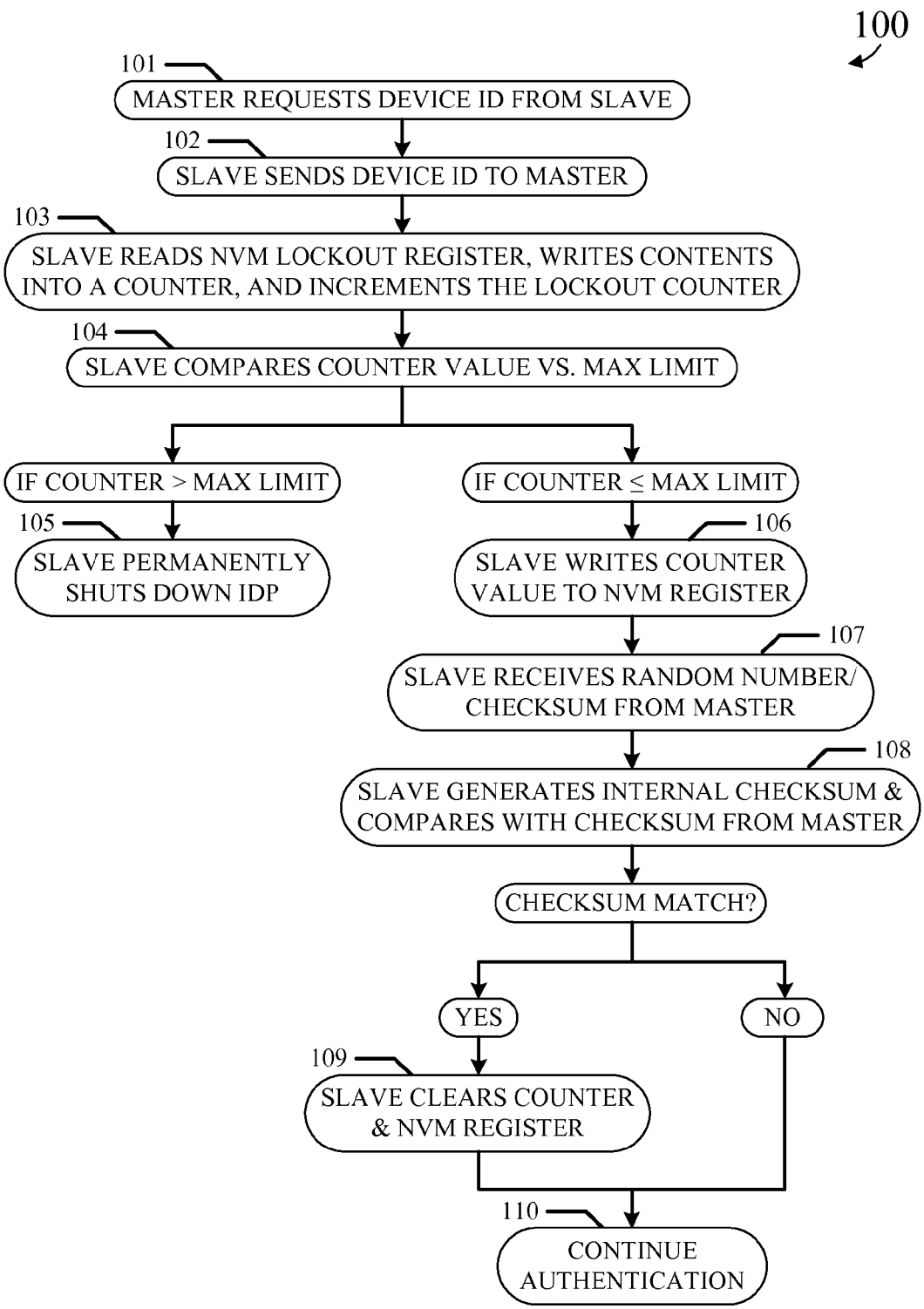
FIG. 1 illustrates generally a flow chart illustrating an example lockout algorithm.

FIG. 1 illustrates generally a flow chart illustrating an example lockout algorithm 100. At 101, a master device (Master) can request a device ID from a slave device (Slave). At 102, the slave device can send the device ID to the master device. At 103, the slave device can read an NVM lockout register, write the contents into a counter, and increment the NVM lockout register. The NVM register can be cleared to all zeros at factory final test. At 104, the slave device can compare the value of the counter to a maximum limit. If, at 104, the counter value is greater than the maximum limit, then, at 105, the slave device can be shut down (e.g., permanently) and future ID transactions can be ignored. If, at 104, the counter value is less than or equal to the maximum limit, then, at 106, the slave device can write the counter value to the NVM register. At 107, the slave device can receive a random number/checksum from the master device. At 108, the slave can generate an internal checksum and compare the internal checksum to the checksum received from the master device. If, at 108, the internal checksum is the same as the received checksum, a valid master device is determined and, at 109, the slave device can clear the counter and the NVM register (e.g., all zeros). If, at 108, the internal checksum is different than the received checksum, an invalid master is determined. At 110, the slave can continue with authentication.

In an example, the maximum limit of consecutive checksum mismatches can be discussed with a customer, but can be relatively low (e.g., less than 100, less than 50, etc.). Further, in certain examples, the above methodology can performed by or added to the master device.

Side channel attack with differential or simple power analysis (DPA, SPA) can require repeated iterations of the slave or master device. Even with existing DPA/SPA countermeasures, there is a future possibility these countermeasures can be circumvented. A mismatch checksum can signify an invalid master device attempting to authenticate. Thus, it can be advantageous to lockout the ID protocol after exceeding the maximum number of attacks.

Figure 2:
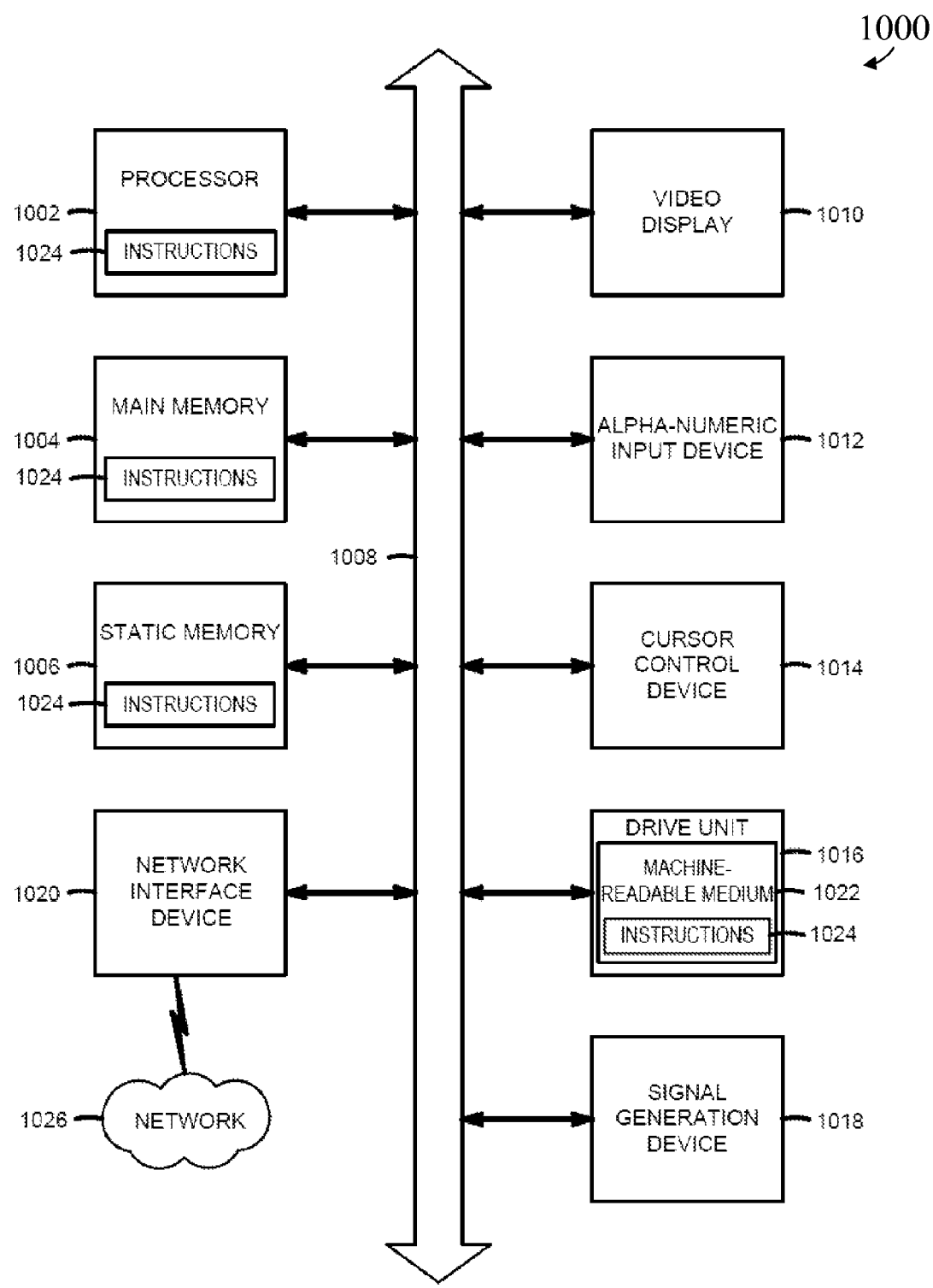
FIG. 2 illustrates generally a diagrammatic representation illustrating a machine in the example form of a computer system, which may be may be part of an example embodiment.

FIG. 2 is a diagrammatic representation of a machine in the example form of a computer system 1000 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 1000 includes a processor 1002 (e.g., a central processing unit (CPU) a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a cursor control device 1014 (e.g., a mouse), a disk drive unit 1016, a signal generation device 1018 (e.g., a speaker) and a network interface device 1020.

Disk drive unit 1016 includes a machine-readable medium 1022 on which is stored one or more sets of instructions (e.g., software 1024) embodying any one or more of the methodologies or functions described herein. The software 1024 may also reside, completely or at least partially, within the main memory 1004, static memory 1006, and/or within the processor 1002 during execution thereof by the computer system 1000, the main memory 1004, the static memory 1006, and the processor 1002 also constituting machine-readable media.

Software 1024 may further be transmitted or received over a network 1026 via the network interface device 1020.

While the machine-readable medium 1022 is shown in an example embodiment to be a single medium, the term "machine-readable medium" should be taken to include a single medium or multiple media (e.g., a centralized or distributed database and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals.

Certain embodiments are described herein as including logic or a number of modules, components or mechanisms. A module, logic, component or mechanism (herein after collectively referred to as a "module") may be a tangible unit capable of performing certain operations and is configured or arranged in a certain manner. In example embodiments, one or more computer systems (e.g., a standalone, client or server computer system) or one or more components of a computer system (e.g., a processor or a group of processors) may be configured by software (e.g., an application or application portion) as a "module" that operates to perform certain operations as described herein.

In various embodiments, a "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g., configured by software) may be driven by cost and time considerations.

Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, a one module may perform an operation, and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

ADDITIONAL NOTES AND EXAMPLES

In Example 1, a system includes a lockout counter and an attack detection module configured to detect an attack to a slave device. The attack detection module is configured to: send a device ID to a master device in response to a received device ID request; increment the lockout counter; if the incremented value of the lockout counter is greater than a maximum limit, permanently shut down the slave device; and, if the incremented value of the lockout counter is less than or equal to the maximum limit: receive a checksum from the master device; generate an internal checksum; compare the received checksum to the generated internal checksum; and, if the received checksum is the same as the internal checksum, clear the lockout counter.

In Example 2, Example 1 optionally includes a master device and a slave device including the lockout counter and the attack detection module.

In Example 3, the slave device of any one or more of Examples 1-2 is optionally configured to couple to the master device using a wired universal serial bus (USB) communication protocol.

In Example 4, the master device of any one or more of Examples 1-3 optionally includes a personal electronic device and the slave device includes an accessory for the mobile electronic device.

In Example 5, any one or more of Examples 1-4 optionally includes a lockout register, wherein the attack detection module is configured to: prior to incrementing the lockout counter, write the value of the lockout register into the lockout counter; if the incremented value of the lockout counter is less than or equal to the maximum limit, write the incremented value of the lockout counter to the lockout register; and, if the received checksum is the same as the internal checksum, clear the lockout counter and the lockout register.

In Example 6, the lockout register of any one or more of Examples 1-5 optionally includes a non-volatile memory (NVM) lockout register.

In Example 7, the attack detection module of any one or more of Examples 1-6 is optionally configured to receive the checksum from the master device appended to a random number and generate the internal checksum using the random number.

In Example 8, the value of the lockout counter of any one or more of Examples 1-7 is optionally independent of a power-on-reset (POR) of the slave device.

In Example 9, a method for detecting an attack to a slave device includes: receiving a device ID request from a master device; sending a device ID to the master device in response to the received device ID request; incrementing a lockout counter; comparing the incremented value of the lockout counter to a maximum limit; if the incremented value of the lockout counter is greater than the maximum limit, permanently shutting down the slave device; and, if the incremented value of the lockout counter is less than or equal to the maximum limit: receiving a checksum from the master device; generating an internal checksum; comparing the received checksum to the internal generated checksum; and, if the received checksum is the same as the internal checksum, clearing the lockout counter.

In Example 10, the slave device of any one or more of Examples 1-9 is optionally configured to couple to the master device according to a wired universal serial bus (USB) communication protocol.

In Example 11, the master device of any one or more of Examples 1-10 optionally includes a personal electronic device and the slave device includes an accessory for the mobile electronic device.

In Example 12, any one or more of Examples 1-11 optionally includes: prior to incrementing the locking counter, writing a value of a lockout register into the lockout counter; if the incremented value of the lockout counter is less than or equal to the maximum limit, writing the incremented value of the lockout counter to the lockout register; and, if the received checksum is the same as the internal checksum, clearing the lockout counter and the lockout register.

In Example 13, the lockout register of any one or more of Examples 1-12 optionally includes a non-volatile memory (NVM) lockout register.

In Example 14, receiving the checksum from the master device of any one or more of Examples 1-13 optionally includes receiving a checksum appended to a random number from the master device, and generating the internal checksum of any one or more of Examples 1-13 optionally includes using the random number.

In Example 15, a non-transitory machine-readable storage medium having instructions stored thereon that, when executed by a machine, cause the machine to perform operations includes: receiving a device ID request from a master device; sending a device ID to the master device in response to the received device ID request; incrementing a lockout counter; comparing the incremented value of the lockout counter to a maximum limit; if the incremented value of the lockout counter is greater than the maximum limit, permanently shutting down the slave device; and, if the incremented value of the lockout counter is less than or equal to the maximum limit: receiving a checksum from the master device; generating an internal checksum; comparing the received checksum to the internal generated checksum; and, if the received checksum is the same as the internal checksum, clearing the lockout counter.

In Example 16, the slave device of any one or more of Examples 1-15 is optionally configured to couple to the master device according to a wired universal serial bus (USB) communication protocol.

In Example 17, the master device of any one or more of Examples 1-16 optionally includes a personal electronic device and the slave device includes an accessory for the mobile electronic device.

In Example 18, the operations further comprise: prior to incrementing the locking counter, writing a value of a lockout register into the lockout counter; if the incremented value of the lockout counter is less than or equal to the maximum limit, writing the incremented value of the lockout counter to the lockout register; and, if the received checksum is the same as the internal checksum, clearing the lockout counter and the lockout register.

In Example 19, the lockout register of any one or more of Examples 1-18 optionally includes a non-volatile memory (NVM) lockout register.

In Example 20, receiving the checksum from the master device of any one or more of Examples 1-19 optionally includes receiving a checksum appended to a random number from the master device, and generating the internal checksum of any one or more of Examples 1-19 optionally includes using the random number.

In Example 21, a system or apparatus can include, or can optionally be combined with any portion or combination of any portions of any one or more of Examples 1-20 to include, means for performing any one or more of the functions of Examples 1-20, or a machine-readable medium including instructions that, when performed by a machine, cause the machine to perform any one or more of the functions of Examples 1-20.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document, for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system comprising:
   a lockout counter; and
   an attack detection circuit coupled to a slave device configured to communicate with a master device, the attack detection circuit configured to detect an attack to the slave device and provide an indication of a detected attack, wherein the attack detection module is configured to:
      send a device ID to the master device in response to a received device ID request;
      increment the lockout counter in response to the received device ID request;
      if the incremented value of the lockout counter is greater than a maximum limit, provide the indication of the detected attack to the slave device; and
      if the incremented value of the lockout counter is less than or equal to the maximum limit:
         receive a checksum from the master device;
         generate an internal checksum;
         compare the received checksum to the generated internal checksum; and
         if the received checksum is the same as the internal checksum, clear the lockout counter.

2. The system of claim 1, including:
   a master device; and
   a slave device including the lockout counter and the attack detection module, wherein the slave device is configured to permanently shut down in response to a received indication of a detected attack from the attack detection circuit.

3. The system of claim 1, wherein the slave device is configured to couple to the master device using a wired universal serial bus (USB) communication protocol.

4. The system of claim 1, wherein the master device includes a personal electronic device and the slave device includes an accessory for the mobile electronic device.

5. The system of claim 1, including:
   a lockout register,
   wherein the attack detection module is configured to:
      prior to incrementing the lockout counter, write the value of the lockout register into the lockout counter;
      if the incremented value of the lockout counter is less than or equal to the maximum limit, write the incremented value of the lockout counter to the lockout register; and
      if the received checksum is the same as the internal checksum, clear the lockout counter and the lockout register.

6. The system of claim 5, wherein the lockout register includes a non-volatile memory (NVM) lockout register.

7. The system of claim 1, wherein the attack detection module is configured to:
   receive the checksum from the master device appended to a random number; and
   generate the internal checksum using the random number.

8. The system of claim 1, wherein the value of the lockout counter is independent of a power-on-reset (POR) of the slave device.

9. A method for detecting an attack to a slave device, comprising:
   receiving a device ID request from a master device;
   sending a device ID to the master device in response to the received device ID request;
   incrementing a lockout counter in response to the received device ID request;
   comparing the incremented value of the lockout counter to a maximum limit;
   if the incremented value of the lockout counter is greater than the maximum limit, providing an indication of a detected attack to the slave device using an attack detection circuit; and
   if the incremented value of the lockout counter is less than or equal to the maximum limit:
      receiving a checksum from the master device;
      generating an internal checksum;
      comparing the received checksum to the internal generated checksum; and
      if the received checksum is the same as the internal checksum, clearing the lockout counter.

10. The method of claim 9, wherein the slave device is configured to couple to the master device according to a wired universal serial bus (USB) communication protocol.

11. The method of claim 9, wherein the master device includes a personal electronic device and the slave device includes an accessory for the mobile electronic device, and
wherein the slave device is configured to permanently shut down in response to a received indication of a detected attack from the attack detection circuit.

12. The method of claim 9, including:
prior to incrementing the locking counter, writing a value of a lockout register into the lockout counter;
if the incremented value of the lockout counter is less than or equal to the maximum limit, writing the incremented value of the lockout counter to the lockout register; and
if the received checksum is the same as the internal checksum, clearing the lockout counter and the lockout register.

13. The method of claim 12, wherein the lockout register includes a non-volatile memory (NVM) lockout register.

14. The method of claim 9, wherein receiving the checksum from the master device includes receiving a checksum appended to a random number from the master device, and
wherein generating the internal checksum includes using the random number.

15. A non-transitory machine-readable storage medium having instructions stored thereon that, when executed by a machine, cause the machine to perform operations comprising:
receiving a device ID request from a master device;
sending a device ID to the master device in response to the received device ID request;
incrementing a lockout counter in response to the received device ID request;
comparing the incremented value of the lockout counter to a maximum limit;
if the incremented value of the lockout counter is greater than the maximum limit, providing an indication of a detected attack to the slave device using an attack detection circuit; and
if the incremented value of the lockout counter is less than or equal to the maximum limit:
receiving a checksum from the master device;
generating an internal checksum;
comparing the received checksum to the internal generated checksum; and
if the received checksum is the same as the internal checksum, clearing the lockout counter.

16. The non-transitory machine-readable storage medium of claim 15, wherein the slave device is configured to couple to the master device according to a wired universal serial bus (USB) communication protocol.

17. The non-transitory machine-readable storage medium of claim 15, wherein the master device includes a personal electronic device and the slave device includes an accessory for the mobile electronic device, and
wherein the slave device is configured to permanently shut down in response to a received indication of a detected attack from the attack detection circuit.

18. The non-transitory machine-readable storage medium of claim 15, wherein the operations further comprise:
prior to incrementing the locking counter, writing a value of a lockout register into the lockout counter;
if the incremented value of the lockout counter is less than or equal to the maximum limit, writing the incremented value of the lockout counter to the lockout register; and
if the received checksum is the same as the internal checksum, clearing the lockout counter and the lockout register.

19. The non-transitory machine-readable storage medium of claim 18, wherein the lockout register includes a non-volatile memory (NVM) lockout register.

20. The non-transitory machine-readable storage medium of claim 15, wherein receiving the checksum from the master device includes receiving a checksum appended to a random number from the master device, and
wherein generating the internal checksum includes using the random number.

\* \* \* \* \*